US012233657B2

(12) United States Patent
Belevski et al.

(10) Patent No.: US 12,233,657 B2
(45) Date of Patent: Feb. 25, 2025

(54) CASE COVER BINDING APPARATUS

(71) Applicant: Lightning Source LLC, LaVergne, TN (US)

(72) Inventors: Zoran Belevski, LaVergne, TN (US); Joshua Sanders, LaVergne, TN (US); Danny Howell, LaVergne, TN (US); John Kwiatkowski, LaVergne, TN (US)

(73) Assignee: Lightning Source LLC, LaVergne (TN)

(*) Notice: Subject to any disclaimer, the term of this patent is extended or adjusted under 35 U.S.C. 154(b) by 0 days.

(21) Appl. No.: 18/668,383

(22) Filed: May 20, 2024

(65) Prior Publication Data

US 2024/0383269 A1 Nov. 21, 2024

Related U.S. Application Data

(60) Provisional application No. 63/467,734, filed on May 19, 2023.

(51) Int. Cl.
*B42C 11/04* (2006.01)
*B42C 19/08* (2006.01)

(52) U.S. Cl.
CPC .............. *B42C 11/04* (2013.01); *B42C 19/08* (2013.01)

(58) Field of Classification Search
CPC ......... B42C 11/02; B42C 11/04; B42C 19/08; B42D 3/00; B65H 31/34; B65H 2301/4381; B65H 2405/115; B65H 2701/1768; B65H 2408/114
USPC ......... 270/58.07, 58.08, 58.11, 58.12, 58.17, 270/58.27; 412/4, 5, 19, 20, 21
See application file for complete search history.

(56) References Cited

U.S. PATENT DOCUMENTS

| | | | | |
|---|---|---|---|---|
| 4,156,538 | A | 5/1979 | Roberts | |
| 5,174,454 | A | 12/1992 | Parkander | |
| 5,178,506 | A | 1/1993 | Meschi | |
| 5,857,830 | A | 1/1999 | Harres et al. | |
| 6,193,458 | B1 | 2/2001 | Marsh | |
| 7,014,182 | B2 * | 3/2006 | Marsh | B42C 5/04 270/52.17 |

(Continued)

FOREIGN PATENT DOCUMENTS

| | | | |
|---|---|---|---|
| CA | 2974039 | A1 | 7/2016 |
| EP | 2269823 | A1 | 1/2011 |

*Primary Examiner* — Leslie A Nicholson, III

(74) *Attorney, Agent, or Firm* — Patterson Intellectual Property Law, PC

(57) ABSTRACT

A system for automated book binding may include a staging platform configured to receive book covers, with first and second walls extending perpendicular to the staging platform, the first wall oriented parallel to the second wall. A controller, in at least an automatic trim adjustment mode, determines one or more book covers as being present upon the staging platform, automatically directs inward movement of at least one of the walls until sensing contact by one or more of the at least one of the walls with the one or more book covers, automatically withdraws the at least one of the walls from a point of contact with the book covers, wherein an operating window is defined by a distance between the walls at the point of contact, and, in sequence, transferring each of the book covers via a lifting arm upward from the staging platform and to a binding unit.

20 Claims, 5 Drawing Sheets

(56) References Cited

U.S. PATENT DOCUMENTS

| | | | |
|---|---|---|---|
| 7,441,762 | B2 | 10/2008 | Kearns |
| 7,557,717 | B2 | 7/2009 | Nichols, Sr. |
| 8,425,389 | B2 | 4/2013 | Dobrovolsky |
| 9,067,453 | B2 | 6/2015 | Wiegand et al. |
| 9,248,687 | B2 * | 2/2016 | Sasamoto ............... B42C 11/02 |
| 9,959,017 | B2 | 5/2018 | Mindrum |
| 10,167,150 | B2 * | 1/2019 | Gugel ...................... B65H 5/08 |
| 10,246,277 | B1 | 4/2019 | Kubiak et al. |
| 10,421,627 | B2 | 9/2019 | Kubiak et al. |
| 10,449,796 | B2 | 10/2019 | Dobrovolsky |
| 2006/0028662 | A1 | 2/2006 | Dobrovolsky |
| 2007/0036637 | A1 | 2/2007 | Hata et al. |
| 2009/0274536 | A1 | 11/2009 | Silberbauer |
| 2010/0158639 | A1 | 6/2010 | Manico et al. |
| 2011/0280688 | A1 | 11/2011 | Mueller |
| 2011/0311336 | A1 | 12/2011 | Tautz |
| 2012/0155701 | A1 | 6/2012 | Levine et al. |
| 2016/0039240 | A1 | 2/2016 | Ishibashi |

* cited by examiner

CASE COVER BINDING APPARATUS

CROSS-REFERENCES TO RELATED APPLICATIONS

This application claims benefit of U.S. Provisional Patent Application No. 63/467,734, filed May 19, 2023, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to processing printed products. More particularly, the present disclosure pertains to an apparatus for case cover binding.

BACKGROUND

Processing printed products, namely manufacturing books, may begin with printing text or other content onto a web or roll of paper material at a printing station. Once the roll of paper material has been printed, the roll of paper is transferred to a cutting station. At the cutting station, the roll of paper is cut into individual sheets. In alternative processes for manufacturing books, the roll of paper may be cut into individual sheets at the cutting station before being transferred to the printing station where text or other content is printed onto the individual sheets.

The individual sheets may be transferred to a folding station where the individual pages are folded. The individual pages or folded pages may then be transferred to a collection station at which the individual sheets are collected and combined into a book block. The book block is then transferred to a binding station where the individual pages or folded pages are bound together and a cover is attached, creating a bound book. The bound book is then transferred to a trimming station where the bound book is trimmed on three sides as needed.

A book binding apparatus binds the book block to the case cover. Conventional case cover binding apparatus may include a system that is operable to feed the case covers into the binding apparatus for further processing. The operator places a plurality of the case covers in a stack at a staging platform. In current practice, the case cover binding apparatus must be manually adjusted to accommodate the trim size of the case cover. This practice reduces cycle time when case covers of various trim sizes are being produced sequentially. Additionally, manually adjusting the case cover binding apparatus requires operator intervention. The operator must adjust the case cover binding apparatus each time a case cover with a different trim size is being processed, representing an ergonomic challenge when multiple changeovers are required within a short period of time.

BRIEF SUMMARY

In view of at least some of the above-referenced problems in conventional case cover binding apparatus, an exemplary object of the present disclosure may be to provide a new and improved case cover binding apparatus that automatically adjusts case cover binding settings to enable custom trim size to be produced. Another exemplary object of the present disclosure may be to increase the throughput capacity of the case cover binding apparatus by reducing cycle time and improving machine ergonomics.

An embodiment of an automated book binding method as disclosed herein may include determining one or more book covers as being present upon a staging platform between first and second walls oriented in parallel with each other and perpendicular with respect to the staging platform, automatically directing inward movement of at least one of the first and second walls until sensing contact by one or more of the first and second walls with the one or more book covers, and automatically withdrawing the at least one of the first and second walls from a point of contact with the one or more book covers, wherein an operating window is defined by a distance between the first and second walls at the point of contact. In sequence, each of the one or more book covers are transferred via a lifting arm upward from the staging platform and at least initially laterally from a lifted position to a binding unit.

In one exemplary aspect according to the above-referenced method embodiment, the one or more book covers may be determined as being present upon the staging platform based on output signals from a load sensor associated with the staging platform. The method may further include determining a variance between a trim size of a top cover of a plurality of book covers present upon the staging platform and a trim size corresponding to the operating window, based upon output signals from an imaging sensor associated with the staging platform. The method may still further include automatically adjusting one or more operating settings for the binding unit based on detected changes in trim size between a previous book cover and the top cover.

In another exemplary aspect according to the above-referenced method embodiment, the one or more book covers may be determined as being present upon the staging platform based on output signals from an imaging sensor associated with the staging platform. The method may further include determining a variance between a trim size of a top cover of a plurality of book covers present upon the staging platform and a trim size corresponding to the operating window, based upon the output signals from the imaging sensor. The method may still further include automatically adjusting one or more operating settings for the binding unit based on detected changes in trim size between a previous book cover and the top cover.

In another exemplary aspect according to the above-referenced method embodiment, the one or more book covers may be determined as being present upon the staging platform based on manual user input, the method further comprising determining a variance between a trim size of a top cover of a plurality of book covers present upon the staging platform and a trim size corresponding to the operating window, based upon output signals from an imaging sensor associated with the staging platform. The method may further include automatically adjusting one or more operating settings for the binding unit based on detected changes in trim size between a previous book cover and the top cover.

In another exemplary aspect according to the above-referenced method embodiment, the at least one of the first and second walls may be withdrawn a predefined distance from the point of contact.

In another embodiment as disclosed herein, a system may be provided for automated book binding, which includes a staging platform configured to receive one or more book covers, first and second walls extending perpendicular to the staging platform, the first wall oriented parallel to the second wall, and a controller. The controller may be configured in at least an automatic trim adjustment mode to direct the performance of steps in the above-referenced method embodiment, optionally further in view of any one or more of the exemplary aspects described thereof.

Numerous objects, features and advantages of the embodiments set forth herein will be readily apparent to those skilled in the art upon reading of the following disclosure when taken in conjunction with the accompanying drawings.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
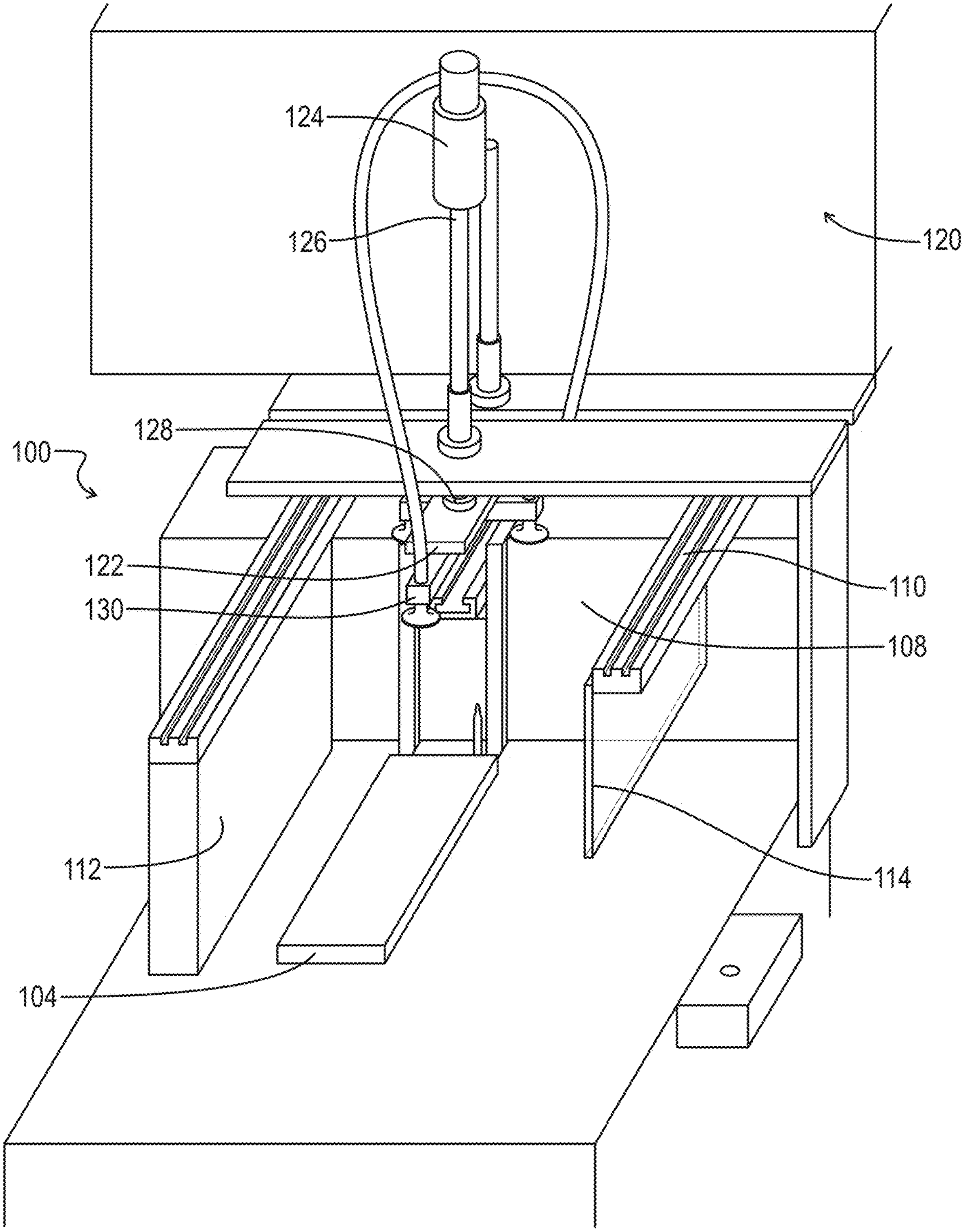
FIG. 1 is a perspective view of an embodiment of a binding apparatus in a system as disclosed herein.

Referring now to the drawings and particularly to FIG. 1, a case cover binding apparatus is shown and generally designated by the number 100. The case cover binding apparatus 100 is operable to bind a case cover 102 (or simply, a "cover") to a collection of individual pages grouped together, referred to as a book block, wherein the case cover 102 may further be referred to herein as a book cover. The number 102 may generally be used throughout this application to designate a single case cover or a plurality of case covers.

Figure 2:
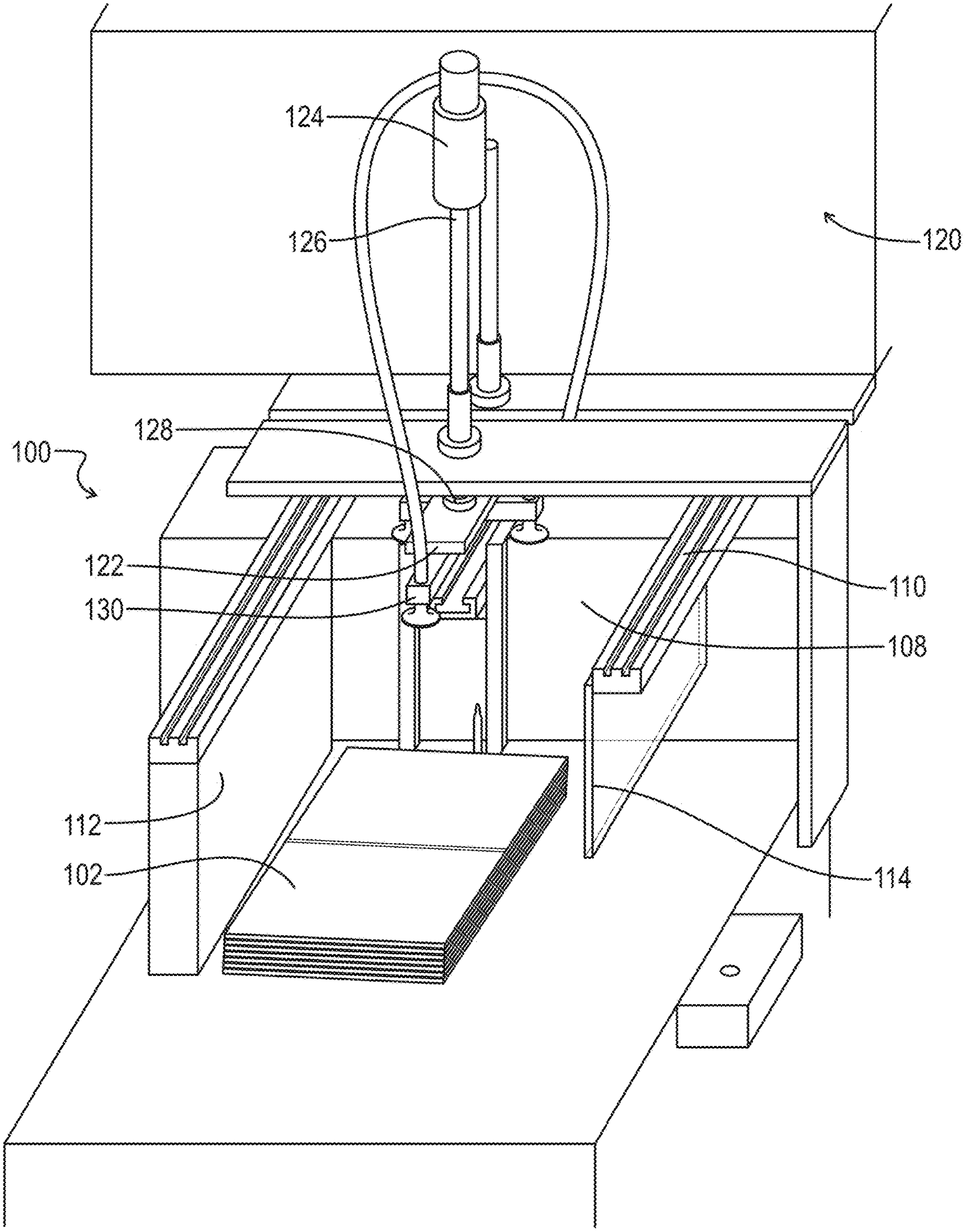
FIG. 2 is a perspective view of the binding apparatus of FIG. 1 including a plurality of case covers.

The case cover binding apparatus 100 includes a case cover staging platform 104 where a plurality of case covers 102 may be stacked before being bound to the book blocks, as shown in FIG. 2. The case cover staging platform 104 is a rectangular, generally flat surface. An operating window may be defined on the case cover staging platform 104.

In an embodiment, the operating window is defined by a fixed wall 108 and a mechanical pusher assembly 110. The fixed wall 108 is fixed in place, positioned perpendicular to the case cover staging platform 104, and acts as a backstop to which the plurality of case covers 102 may be pushed against. The fixed wall 108 separates the case cover staging platform 104 from the remaining portions of the case cover binding apparatus.

The mechanical pusher assembly 110 includes first and second walls 112, 114. The first and second walls 112, 114 are positioned perpendicular to the fixed wall 108 and the case cover staging platform 102. The first and second walls 112, 114 are positioned parallel to each other.

Figure 5:
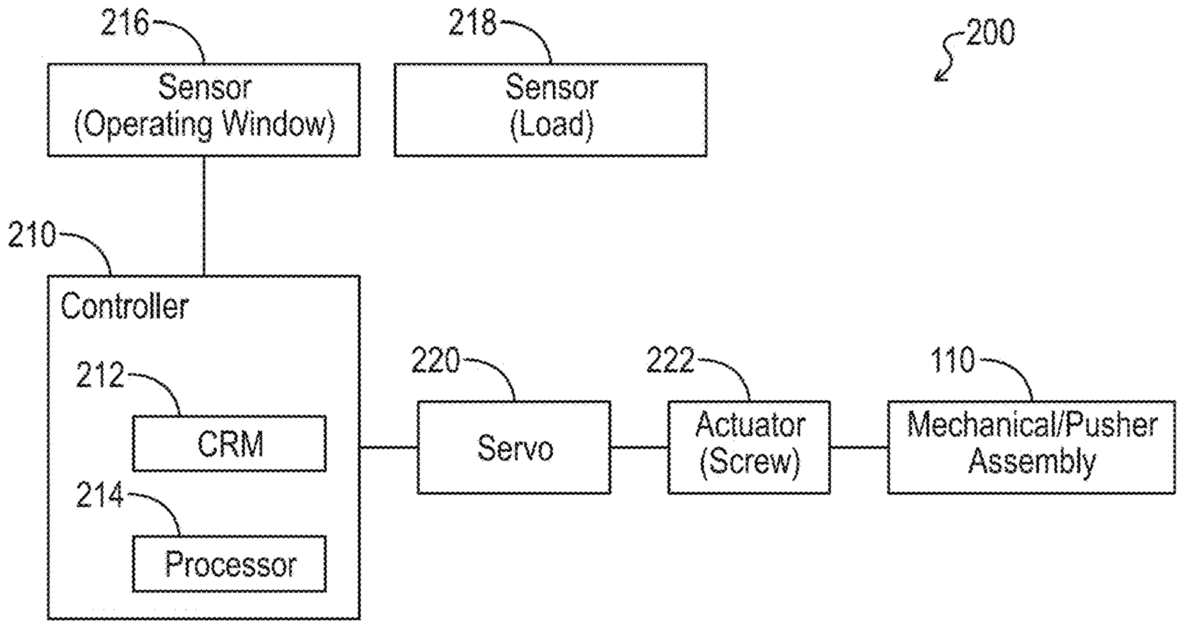
FIG. 5 is a graphical diagram representing an exemplary embodiment of the system as disclosed herein.

The mechanical pusher assembly 110 may be driven by a drive system 220, which in an embodiment is part of a more comprehensive control system 200 as represented in FIG. 5. A controller 210 may be configured to receive output signals from one or more sensors 216, 218 for performing control functions as described herein, such as providing control signals to the drive system 220. The drive system 220 may include a conventional servo motor 220. In an embodiment, the servo motor 220 itself may comprise a motor, a sensor, and control electronics, independent of an external controller. The motor 220 may utilize direct current or alternating current, be brushed or brushless, be rotary or linear, and be any one of a variety of sizes.

A sensor 216 for determining an operating window associated with the staging platform may be or otherwise include a potentiometer, tachometer, resolver, encoder, linear transducer, or any other sensor. The sensor is configured to output feedback data. The controller 210 (or control electronics associated with the drive system 220) is configured to receive the feedback data from the sensor 216, compare the feedback data to a command reference, and control a level of power transmitted to the motor. An actuator 222 such as a lead screw 222 may be interposed between the mechanical pusher assembly 110 and the drive system 220. The drive system 220 drives the lead screw 222 which in turn drives the mechanical pusher assembly 110.

The first wall 112 and the second wall 114 are configured to translate in a direction parallel to the fixed wall 108 and case cover staging platform 104. When the lead screw 222 rotates a first direction, the first wall 112 moves towards the second wall 114 and the second wall 114 moves towards the first wall 112 such that a distance between the first and second walls 112, 114 decreases. When the lead screw 222 rotates in a second direction, the first wall 112 moves away from the second wall 114 and the second wall 114 moves away from the first wall 112 such that the distance between the first and second walls 112,114 increases. Adjusting the distance between the first and second walls 112, 114 thereby adjusts the operating window of the case cover binding apparatus 100.

In one embodiment, a speed of translation of the first wall 112 is the same as a speed of translation of the second wall 114. In an alternative embodiment, the speed of translation of the first wall 112 may be different than the speed of translation of the second wall 114. In another alternative embodiment, one of the first or second walls 112, 114 may remain stationary while the other wall translates.

The controller 210 may be or otherwise include a programmable logic controller (PLC). The controller 210 may be part of a case cover binding apparatus control system, may be part of the drive system, or it may be a separate module. The controller 210 may be configured to receive input signals from various sensors, including a sensor 216 for providing signals representative of the operating window as noted above, and optionally a sensor 218 for providing signals representative of the presence of covers on the staging platform 102. The sensor 218 in various embodiments may include a load sensor associated with the staging platform, one or more imaging sensors such as for example cameras having a field of view corresponding generally with the staging platform, optical sensors and associated lighting units, etc.

The controller 210 as noted above may generate control signals for controlling the operation of the case cover binding apparatus 100, including in various embodiments some or all of the mechanical pusher assembly 110, a lifting arm, a binding unit, and the like.

The controller 210 may in various embodiments include a processor 214, a computer readable medium 212 having processor-executable code residing thereon, a database (residing thereon or accessible thereby), and an input/output module or control panel having a display. An input/output device, such as a keyboard, joystick, or other user interface, may be provided so that the human operator may input instructions to the controller. It may be understood that the controller described herein may be a single controller having all of the described functionality, or it may include multiple controllers wherein the described functionality is distributed among the multiple controllers.

Various operations, steps, or algorithms as described in connection with the controller 210 can be embodied directly in hardware, in a computer program product such as a software module executed by the processor 214, or in a combination of the two. The computer program product can reside in RAM memory, flash memory, ROM memory, EPROM memory, EEPROM memory, registers, hard disk, a removable disk, or any other form of computer-readable medium 212 known in the art. An exemplary computer-readable medium 212 can be coupled to the processor 214 such that the processor 214 can read information from, and write information to, the memory/storage medium. In the alternative, the medium can be integral to the processor. The processor and the medium can reside in an application specific integrated circuit (ASIC). The ASIC can reside in a user terminal. In the alternative, the processor 214 and the medium 212 can reside as discrete components in a user terminal.

The term "processor" 214 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Figure 6:
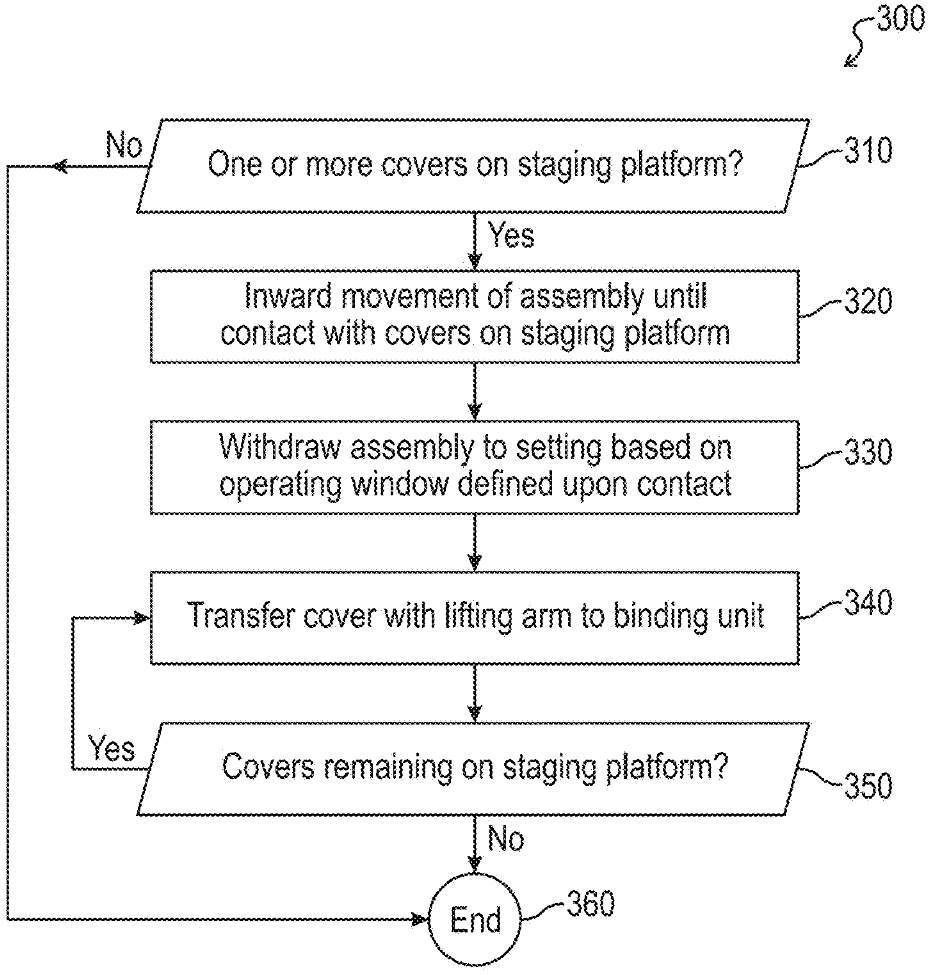
FIG. 6 is a flowchart representing an exemplary embodiment of a method as disclosed herein.

Referring next to FIG. 6, a method 300 may now be described, which may for example be executed in association with an embodiment of a case cover binding apparatus 100 and system 200 as otherwise described herein.

The method 300 may in an embodiment begin with determining that one or more covers are present on the cover staging platform 104 (step 310). In an embodiment, the presence of covers may be determined using input signals from one or more sensors 218 configured for this purpose. For example, a sensor 218 in various embodiments may include a load sensor associated with the staging platform, one or more imaging sensors such as for example cameras having a field of view corresponding generally with the staging platform, optical sensors and associated lighting units, etc.

The illustrated method 300 may continue in step 320 with inward movement of the first and second walls 112, 114, for example as directed by the controller 210, until contact is detected between the walls and the one or more covers on the staging platform 104. In one embodiment, the case cover binding apparatus 100 includes at least one contact sensor 216. The at least one contact sensor is configured to sense when the first and second walls 112, 114 contact the case cover 102 placed on the cover staging platform 104. The controller 210 is configured to rotate the lead screw 222 such that the first and second walls 112, 114 move toward each other until the contact sensor 216 detects that the first and second walls 112, 114 have contacted the case cover 102.

Once contact has been detected, the controller 210 in step 330 then backs out the lead screw 222 slightly such that the first and second walls 112, 114 move apart a small distance and a desired operating window is defined. Backing out the lead screw causes the operating window to be slightly larger than the trim size of the case cover 102. This allows the case covers 102 to feed into a binding portion 120 of the case cover binding apparatus 100 smoothly. The desired operating window may in an embodiment be defined by withdrawal of at least one of the first and second walls 112, 114 a specified distance from the detected point of contact. In another embodiment, the desired operating window may be a specified window, wherein withdrawal of the at least one of the first and second walls 112, 114 may be a dynamic distance from the detected point of contact as needed to satisfy the specified window.

In an alternative embodiment, the case binding apparatus 100 includes at least one non-contact sensor, e.g., an imaging sensor or optical sensor, configured to detect a trim size of the case cover 102 placed on the staging platform 104 and output a trim size signal to the controller 210. The controller 210 receives the trim size signal from the non-contact sensor, determines an appropriate operating window via for example image segmentation, and outputs a drive system control signal. The drive system control signal is received by the drive system 220 which in turn rotates the lead screw 222. Thus, the distance between the first and second wall 112, 114 is adjusted in response to the trim size signal and the desired operating window is defined.

Figure 3:
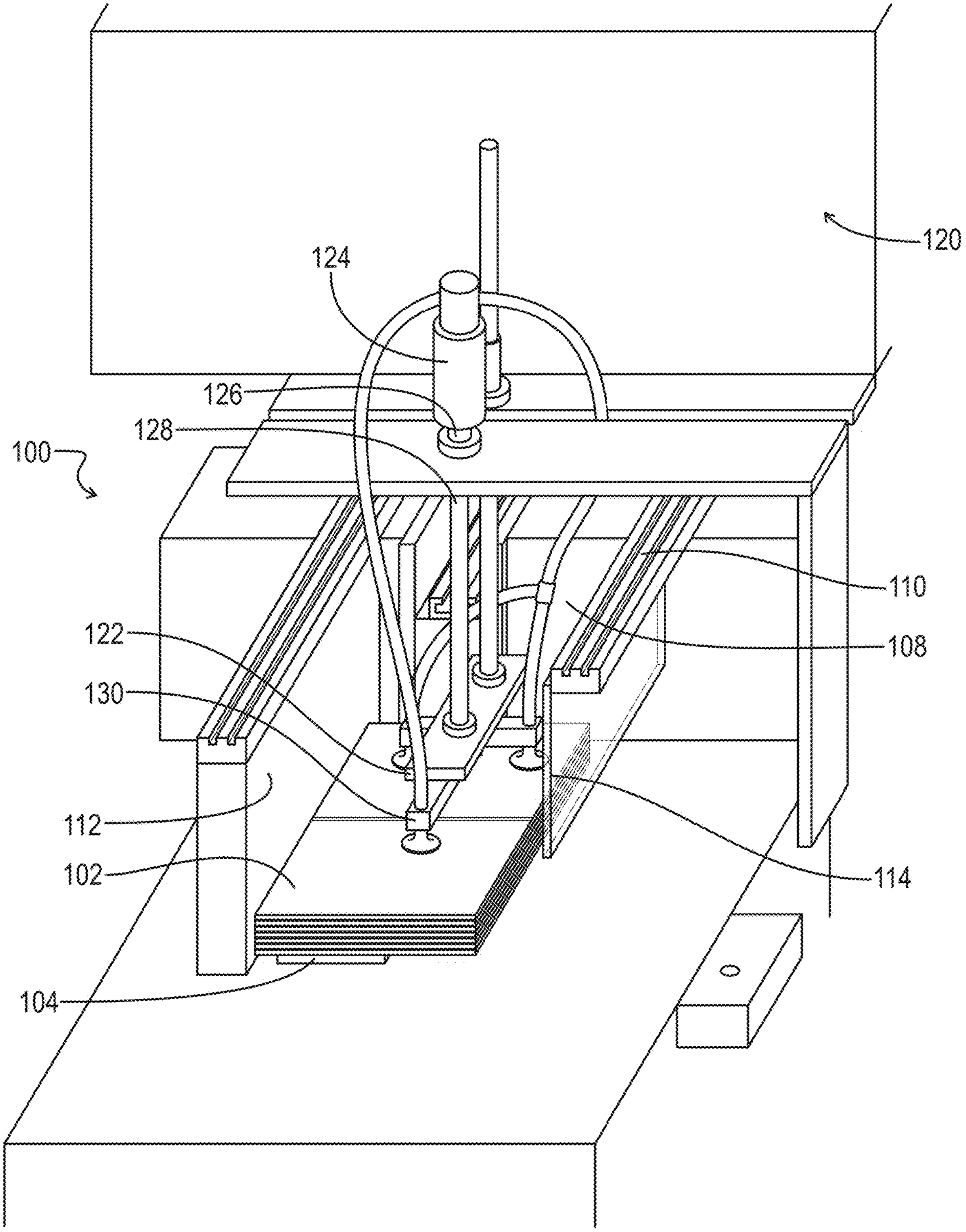
FIG. 3 is a perspective view of the binding apparatus of FIG. 1, further including the plurality of case covers having been repositioned through inward movement of the parallel first and second walls.
Figure 4:
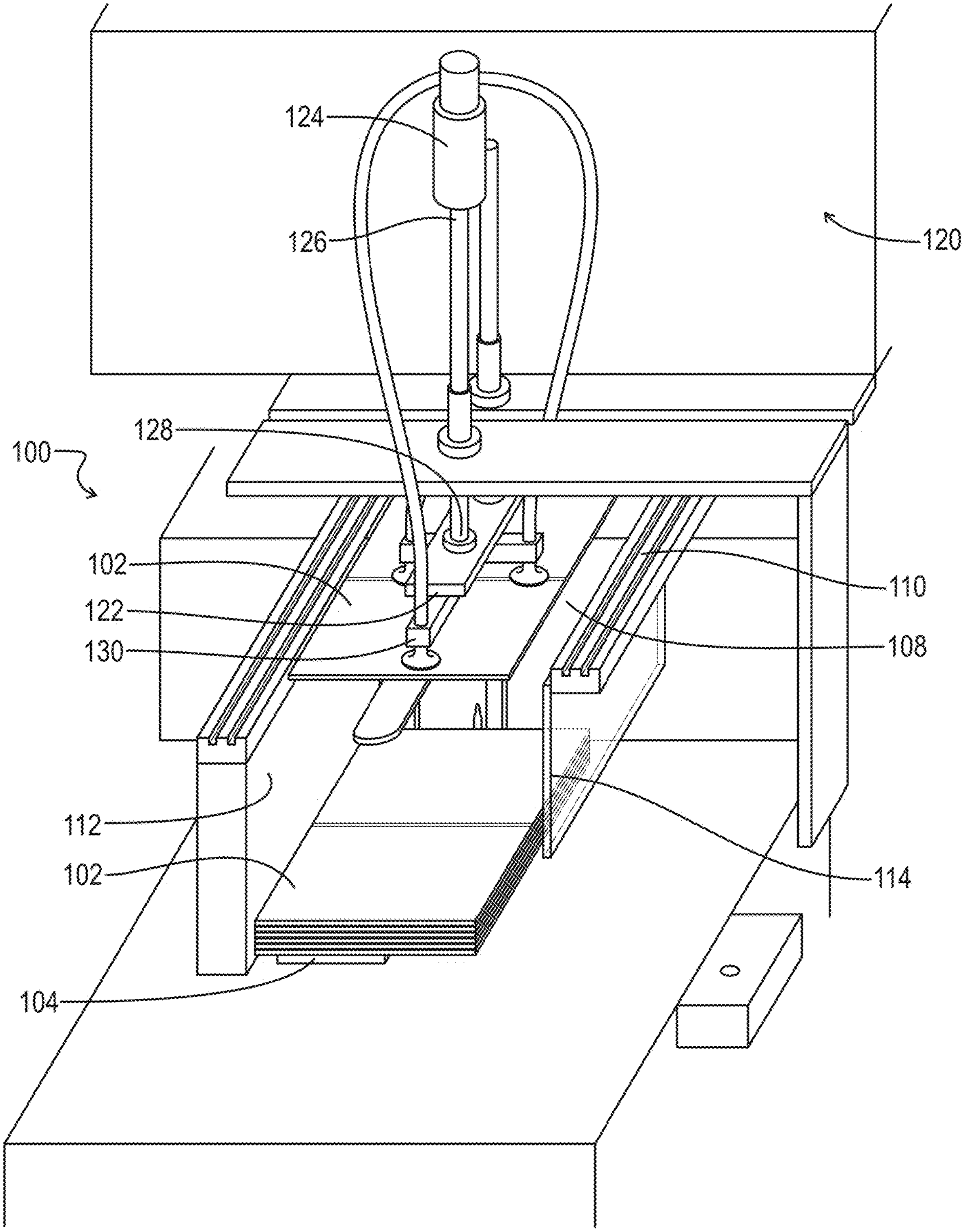
FIG. 4 is a perspective view of the binding apparatus of FIG. 1, further wherein a listing arm has been deployed to transmit a top case cover from the staging platform to a binding unit of the system.

The case cover binding apparatus 100 may further include a loading arm 122. The loading arm 122 is positioned above the case cover staging platform 104. The loading arm 122 includes a linear actuator 124 having an upper end 126 and a lower end 128. The linear actuator 124 may be a hydraulic cylinder, electrically power linear actuator, or any other type of linear actuator. The lower end 128 of the linear actuator 124 includes an implement 130. The loading arm 122 is configured in step 340 to lower the implement 130 such that it engages with an uppermost case cover of the plurality of case covers 102, as shown in FIG. 3. The implement 130 is operable to selectively couple to the uppermost case cover. The implement 130 may couple to the uppermost case cover via suction, mechanical grip, or another suitable coupling method. Once the implement 130 couples to the uppermost case cover 102, the linear actuator 124 is configured to raise the implement 130 and thus lift the uppermost case cover, as shown in FIG. 4.

The case cover binding apparatus 100 may further include an intake arm 132. The intake arm 132 selectively extends out from above the fixed wall 108. The intake arm 132 is oriented such that a flat side of the intake arm 132 is parallel to the case cover staging platform 104. The intake arm 132 is configured to extend below the uppermost case cover when it is suspended in the air by the loading arm 122 and support the uppermost cover when the implement 130 decouples from the case cover 102. The intake arm 132 is further configured to retract into the binding portion 120 of the case cover binding apparatus 100, thus moving the case cover 102 from above the case cover staging platform 104 into the binding portion 120.

As represented in step 350, the method 300 may continue with a determination whether additional covers still remain on the staging platform 104. If one or more covers are still located in the assembly area (i.e., "yes" in response to the query of step 350), the method 300 may return to step 340 and perform at least one further iteration. If no covers remain (i.e., "no" in response to the query of step 350), the method 300 may end in step 360 and only restart in step 310 upon determining that one or more covers have been placed or otherwise provided on the staging platform 104.

In one exemplary embodiment of step 310 of the method 300 for binding a case cover to a book block via the case cover binding apparatus 100, a human operator first places a plurality of case covers 102 on the case cover staging platform 104 in a setup position. The case covers 102 may be stacked in an inverted pyramid shape such that the smallest case cover 102 is placed on a bottom of the stack nearest the case cover staging platform 104, and the largest case cover 102 is placed on a top of the stack. Once the case covers 102 have been placed, the human operator engages the input/output device of the controller 210.

If the embodiment includes the non-contact sensor, the non-contact sensor detects the trim size of the case cover and outputs a trim size signal to the controller 210. The controller 210 receives the trim size signal from the non-contact sensor and outputs a drive system control signal. The drive system control signal is received by the drive system 220, which rotates the lead screw 222 as needed. Thus, the distance between the first and second wall 112, 114 is adjusted in response to the trim size signal and the desired operating window is defined.

If the embodiment includes the contact sensor, the controller 210 is configured to rotate the lead screw 222 such that the first and second walls 112, 114 move toward each other. When the contact sensor detects that the first and second walls 112, 114 have contacted the case cover 102, the controller then backs out the lead screw slightly such that the first and second walls 112, 114 move apart a small distance and a desired operating window is defined.

In an embodiment, once the operating window is defined, a human operator may push the plurality of case covers 102 until an uppermost cover of the plurality of case covers 102 contacts the fixed wall 108. The loading arm 122 lowers the lower end 128 of the linear actuator 124 and the implement 130 until the implement 130 contacts the uppermost case cover, as shown in FIG. 3. The implement 130 engages with the uppermost case cover and the loading arm 122 lifts the lower end 128 of the linear actuator 124, thus lifting the uppermost case cover above the cover staging platform 104, as shown in FIG. 4. The intake arm 132 extends below the uppermost case cover that is suspended in the air by the loading arm 122. The loading arm 122 decouples from the uppermost case cover and the intake arm 132 supports the uppermost case cover. The intake arm 132 retracts, thus moving the uppermost case cover from above the case cover staging platform 104 and into the binding portion 134 of the case cover binding apparatus 100.

If a subsequent uppermost case cover of the plurality of case covers 102 has the same trim size as the already processed uppermost case cover, the case cover binding apparatus 100 may process the subsequent uppermost case cover into the binding portion 134 without adjusting the operating window. If the subsequent uppermost case cover of the plurality of case covers 102 is a different trim size, the case cover binding apparatus 100 will detect the trim size of the subsequent uppermost case cover, either through the non-contact or contact sensor, and adjust the operating window accordingly. Thus, the case cover binding apparatus 100 may process case covers 102 having different trim sizes without the need for intervention by the human operator.

Thus, a new and novel case cover binding apparatus is provided that binds a case cover to a book block. The case cover binding apparatus is capable of automatically adjusting case cover binder settings to enable custom trim size to be successfully produced in an operational environment. The binding apparatus does not need to be manually adjusted by a human operator to accommodate the trim size of the case cover. This automation increases the throughput capacity of the equipment. Thus, cycle times are reduced when various trim sizes are being produced sequentially. Additionally, the case cover binding apparatus reduces the amount of human operator intervention needed and provides an ergonomic solution to the problems with conventional case cover binding apparatus.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. An automated book binding method, comprising:
- determining one or more book covers as being present upon a staging platform between first and second walls oriented in parallel with each other and perpendicular with respect to the staging platform;
- automatically directing inward movement of at least one of the first and second walls until sensing contact by one or more of the first and second walls with the one or more book covers;
- automatically withdrawing the at least one of the first and second walls from a point of contact with the one or more book covers, wherein an operating window is defined by a distance between the first and second walls at the point of contact;
- in sequence, transferring each of the one or more book covers via a lifting arm upward from the staging platform and at least initially laterally from a lifted position to a binding unit.

2. The method of claim 1, comprising determining the one or more book covers as being present upon the staging platform based on output signals from a load sensor associated with the staging platform.

3. The method of claim 2, further comprising determining a variance between a trim size of a top cover of a plurality of book covers present upon the staging platform and a trim size corresponding to the operating window, based upon output signals from an imaging sensor associated with the staging platform.

4. The method of claim 3, further comprising automatically adjusting one or more operating settings for the binding unit based on detected changes in trim size between a previous book cover and the top cover.

5. The method of claim 1, comprising determining the one or more book covers as being present upon the staging platform based on output signals from an imaging sensor associated with the staging platform.

6. The method of claim 5, further comprising determining a variance between a trim size of a top cover of a plurality of book covers present upon the staging platform and a trim size corresponding to the operating window, based upon the output signals from the imaging sensor.

7. The method of claim 6, further comprising automatically adjusting one or more operating settings for the binding unit based on detected changes in trim size between a previous book cover and the top cover.

8. The method of claim 1, comprising determining the one or more book covers as being present upon the staging platform based on manual user input, and further comprising determining a variance between a trim size of a top cover of a plurality of book covers present upon the staging platform and a trim size corresponding to the operating window, based upon output signals from an imaging sensor associated with the staging platform.

9. The method of claim 8, further comprising automatically adjusting one or more operating settings for the binding unit based on detected changes in trim size between a previous book cover and the top cover.

10. The method of claim 1, wherein the at least one of the first and second walls are withdrawn a predefined distance from the point of contact.

11. A system for automated book binding, the system comprising:
- a staging platform configured to receive one or more book covers;
- first and second walls extending perpendicular to the staging platform, the first wall oriented parallel to the second wall;
- a controller configured in at least an automatic trim adjustment mode to:
  - determine one or more book covers as being present upon the staging platform;
  - automatically direct inward movement of at least one of the first and second walls until sensing contact by one or more of the first and second walls with the one or more book covers;
  - automatically withdraw the at least one of the first and second walls from a point of contact with the one or more book covers, wherein an operating window is defined by a distance between the first and second walls at the point of contact; and
  - in sequence, transfer each of the one or more book covers via a lifting arm upward from the staging platform and at least initially laterally from a lifted position to a binding unit.

12. The system of claim 11, wherein the controller is configured to determine the one or more book covers as being present upon the staging platform based on output signals from a load sensor associated with the staging platform.

13. The system of claim 12, wherein the controller is configured to determine a variance between a trim size of a top cover of a plurality of book covers present upon the staging platform and a trim size corresponding to the operating window, based upon output signals from an imaging sensor associated with the staging platform.

14. The system of claim 13, wherein the controller is configured to automatically adjust one or more operating settings for the binding unit based on detected changes in trim size between a previous book cover and the top cover.

15. The system of claim 11, wherein the controller is configured to determine the one or more book covers as being present upon the staging platform based on output signals from an imaging sensor associated with the staging platform.

16. The system of claim 15, wherein the controller is configured to determine a variance between a trim size of a top cover of a plurality of book covers present upon the staging platform and a trim size corresponding to the operating window, based upon the output signals from the imaging sensor.

17. The system of claim 16, wherein the controller is configured to automatically adjust one or more operating settings for the binding unit based on detected changes in trim size between a previous book cover and the top cover.

18. The system of claim 11, wherein the controller is configured to determine the one or more book covers as being present upon the staging platform based on manual user input, and further determine a variance between a trim size of a top cover of a plurality of book covers present upon the staging platform and a trim size corresponding to the operating window, based upon output signals from an imaging sensor associated with the staging platform.

19. The system of claim 18, wherein the controller is configured to automatically adjust one or more operating settings for the binding unit based on detected changes in trim size between a previous book cover and the top cover.

20. The system of claim 11, wherein the at least one of the first and second walls are withdrawn a predefined distance from the point of contact.

* * * * *